United States Patent

[11] 3,567,925

| [72] | Inventors | Marvin Luis Muga<br>Gainesville, Fla.;<br>Howard E. Taylor, Oak Ridge, Tenn. |
| --- | --- | --- |
| [21] | Appl. No. | 748,067 |
| [22] | Filed | July 26, 1968 |
| [45] | Patented | Mar. 2, 1971 |
| [73] | Assignee | The United States of America, as represented by the United States Atomic Energy Commission |

[54] AN IMPROVED CHARGED PARTICLE DETECTOR
3 Claims, 7 Drawing Figs.

| [52] | U.S. Cl................................................. | 250/71.5, 250/106 |
| --- | --- | --- |
| [51] | Int. Cl................................................... | G01t 1/20 |
| [50] | Field of Search.................................... | 250/71.5, 106 (SC) |

[56] References Cited
UNITED STATES PATENTS
2,911,534  11/1959  Brannon, Jr. et al..........  250/71.5

Primary Examiner—James W. Lawrence
Assistant Examiner—Morton J. Frome
Attorney—Roland A. Anderson ABSTRACT: A new time-of-flight particle detector comprises an ultra thin plastic scintillator placed perpendicular to the face of a photomultiplier tube and sandwiched between two Lucite light pipes. The Lucite enclosure has a large hole for passage of fragments through the thin scintillator with a minimum energy loss, as small as 1 percent for fission fragments. A fission fragment, upon passing through the scintillator, triggers a light flash which traverses the film and light pipes and in turn is detected by the photomultiplier tube. Rise times of the order of 2 nanoseconds are achieved and the efficiency of detection is 100 percent for fission fragments. This detector has the great advantage of providing a clear distinction between time pulses and background noise.

PATENTED MAR 2 1971 3,567,925

INVENTORS.
Marvin L. Muga
BY Howard E. Taylor

ATTORNEY.

INVENTORS.
Marvin L. Muga
BY Howard E. Taylor

ATTORNEY.

AN IMPROVED CHARGED PARTICLE DETECTOR

BACKGROUND OF THE INVENTION

The present invention was made in the course of, or under, a contract with the U.S. Atomic Energy Commission.

The field of art to which the present invention pertains is that in which the velocity of a charged nuclear particle can be determined by measurement of its time-of-flight over a known distance. In this method, the particle must interact with a detector at point A and at time $t$, and then interact with a second detector at point B, a distance $d$ away at some later time, $t + \delta t$. This time difference is then usually converted to a measurable pulse height by electronic means. An ideal detector will have the following characteristics:

1. Minimum slowing down (energy loss) of the particle passing through.
2. Large signal-to-background noise ratio.
3. Fast rise time for the pickoff (timing) pulse.
4. Negligible time jitter.
5. 100 percent detection efficiency (zero transparency) of passing particles.

Obviously, features (1) and (2) above are mutually imcompatible and in practice some optimum condition must be sought. The usual technique for measuring flight times of atomic nuclei of a few hundred MeV energy or less (fission fragments, for example) is by the use of a thin metal (or metal-covered plastic) foil and an electron lens system. The metal foil is kept at a high negative voltage and charged particles passing therethrough knock out electrons that are made to converge upon a thin plastic scintillator that is coupled to a photomultiplier tube. This scheme works well in low radiation fields, but in moderate and high radiation fields the background noise increases to an intolerable level due to spurious electron emission from the high voltage (metal foil) terminal, probably radiation induced through ionization processes.

Thus, there exists a need for a time-of-flight particle detector that can be effectively and efficiently used in moderate and high radiation fields, while at the same time providing a clear distinction between time pulses and background noise, and providing a minimum energy loss of the particles being analyzed. The present invention was conceived to meet this need in a manner to be described hereinbelow.

SUMMARY OF THE INVENTION

It is the object of the present invention to provide a new time-of-flight particle detector that can be of practical use in moderately high radiation fields. The above object has been accomplished in the present invention by positioning an ultrathin plastic scintillator "perpendicular" to the face of a photomultiplier tube and sandwiched between two Lucite pipes such that a fission fragment, upon passing through the scintillator, triggers a light flash which traverses the film and light pipes and in turn is detected by the photomultiplier tube which provides timing, or gating, pulses to a time-of-flight system to be described hereinbelow. It should be noted that the present detector does not require the use of a thin metal foil with its attendant spurious electron emission problem, and that the scintillator of the present invention is placed "perpendicular" to the face of the photomultiplier tube rather than parallel and adjacent thereto as in prior art devices. Thus, in the arrangement of the present invention, a time-of-flight detector is provided in which the efficiency of detection is 100 percent for fission fragments, in which there is provided a clear distinction between time pulses and background noise, particularly in high radiation fields, and in which there is provided a minimum energy loss of the particles passing through the detector.

DESCRIPTION OF THE PREFERRED EMBODIMENT

Figure 1:
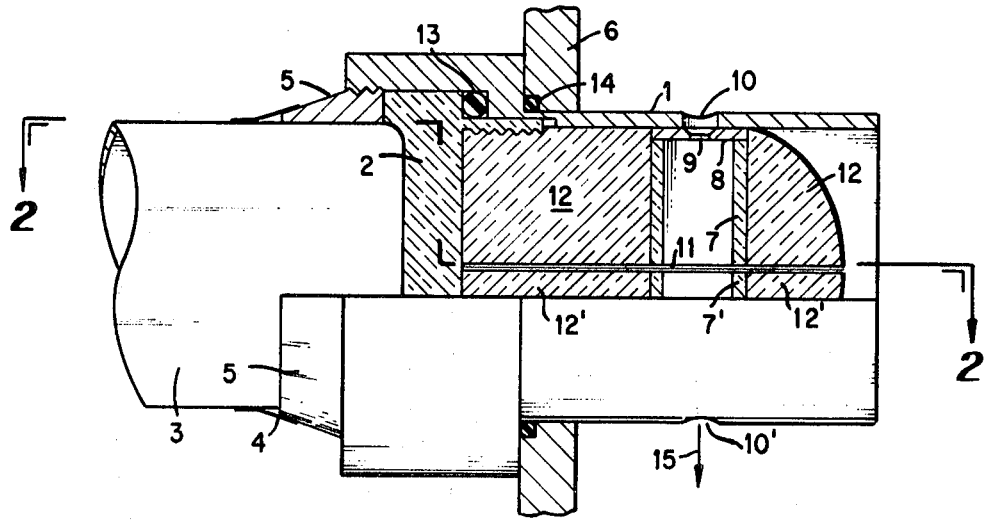
FIG. 1 is a partial cross-sectional view of the particle detector of the present invention.

In FIG. 1, an aluminum can 1, which is polished internally, is mounted within an opening in a vacuum chamber wall 6. Mounted within the can 1 are the front end of a photomultiplier tube 3, a Lucite light pipe 2 positioned adjacent to the face of the tube 3, a split Lucite film holder having separated halves 12, 12' between which is sandwiched an ultrathin plastic scintillator film 11 such that the scintillator is positioned perpendicular to the face of the photomultiplier tube 3, and the Lucite film holder halves 12, 12' are each provided with an elongated large hole into which hollow Lucite inserts 7, 7' are respectively placed. Each of the inserts, 7, 7' is provided with a lead collimator 8 attached thereto and adjacent to the inner surface of the can 1, with each collimator 8 provided with a collimating aperture 9. Only one of the collimators 8 is shown in FIG. 1. The can 1 is provided with diametrically disposed openings 10, 10', such that a beam of charged particles 15 may pass through can opening 10, the collimator opening 9, the hollow insert 7, then through the scintillator 11, hollow insert 7', the other collimator opening, not shown, and finally through the can opening 10'.

Figure 2:
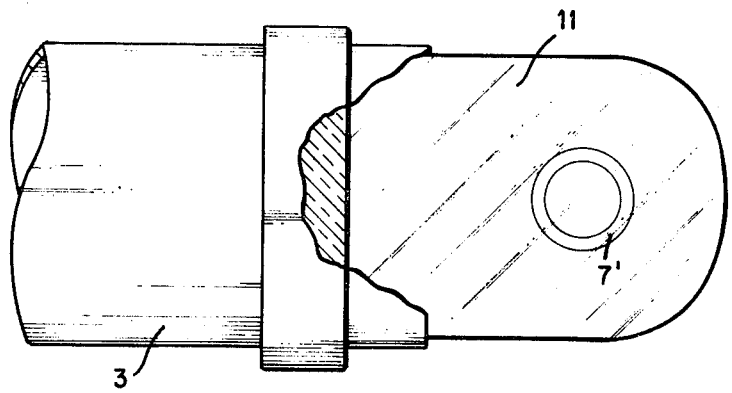
FIG. 2 is a partial sectional view along the line 2–2 of FIG. 1.

An O-ring 14 is provided between the can 1 and the vacuum chamber wall 6, and another O-ring 13 is provided between the can 1 and the Lucite light pipe 2. The portion of the can 1 beyond the vacuum chamber wall 6 is threadedly secured to a bushing 5 which is affixed to the tube 3. A light seal 4 is affixed to the tube 3 and bushing 5, as shown. A top view of the thin scintillator film 11 is shown in FIG. 2.

Figure 3:
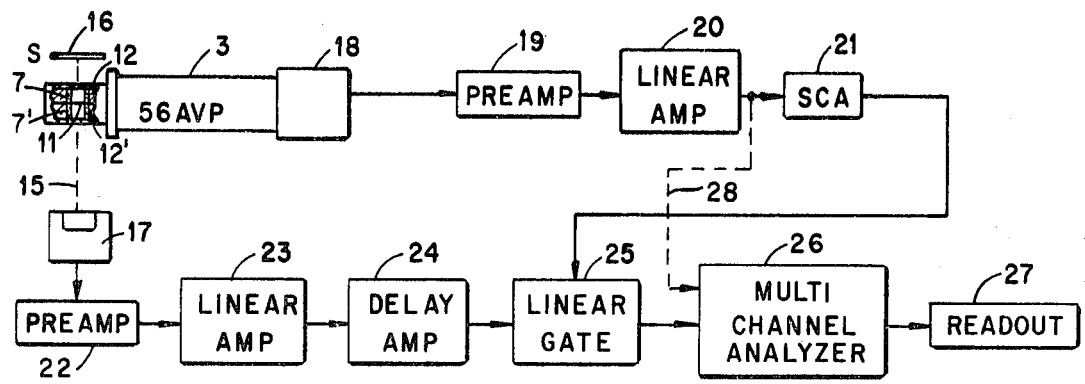
FIG. 3 is a block diagram of a readout system for the detector of FIG. 1, which system can be used as part of a time-of-flight analyzer or for determining the detector output directly.

The readout system in which the detector of FIG. 1 may be used is illustrated in FIG. 3. The beam of charged particles 15 may be obtained from a $Cf^{252}$ source 16, for example. The beam 15 from the source 16 passes through thin scintillator film 11 of the detector and then impinges upon a solid state surface barrier detector 17. The output of the detector 17 is fed to an integrating preamplifier 22. The unit 22 is connected to single-delay-line linear amplifier 23 which in turn is connected to a delay amplifier 24. The unit 24 is connected to a linear gate 25, which gate is also connected to the output of a single-channel analyzer 21.

The output of the thin scintillator film 11 is sensed by the photomultiplier 3 is fed to the single-channel analyzer 21 by means of the output of photomultiplier 3, a voltage divider network 18, an integrating preamplifier 19, and a single-delay-line linear amplifier 20. The output of the linear gate 25 is fed to a multichannel analyzer 26 which in turn is connected to a readout unit 27. The unit 27 may be an oscilloscope and typewriter, for example.

The preamplifiers 19 and 22 may be ORTEC Model No. 113, for example. The linear amplifiers 20 and 23 may be Canbarra Model No. 810, the delay amplifier 24 may be ORTEC Model No. 411, the linear gate 25 may be ORTEC Model No. 409, the single-channel analyzer 21 may be ORTEC Model No. 413, the multichannel analyzer 26 may be Nuclear Data Model No. 110, and the unit 3 may be a 56 AVP photomultiplier, for example.

The thickness of the thin scintillator film utilized in the device of FIG. 1 and the system of FIG. 3 is not critical, but may vary from 10 $\mu$g/cm$^2$ to 2 mg/cm$^2$, for example. However, the use of the thinnest film is preferred for detecting fission fragments since there is a minimum of energy loss of the particles passing through the detector for such a film. Thicker films would be more suitable for lighter particles.

It should be understood that when it is desired to determine directly the output of the thin film of FIG. 1, the system of FIG. 3 can be modified to connect the output of linear amplifier 20 directly to the multichannel analyzer 26 by the dashed line 28, and disconnect the linear gate 25 from the analyzer 26.

In the operation of the detector of FIG. 1 in the system of FIG. 3, each of a plurality of fission fragments, upon passing through the scintillator film 11, triggers a light flash which traverses the film and light pipes and in turn is detected by the photomultiplier tube 3. The output of the tube 3 in turn provides a plurality of timing, or gating, pulses to the linear gate 25 of FIG. 3. The readout provided by unit 27 will then be a spectrum of the residual fission fragment energy taken in coincidence with, or gated by, all of or selected ones of the photomultiplier pulses. It has been determined that rise times of the order of 2 nanoseconds can be achieved and the efficiency of detection is 100 percent for fission fragments in the operation of the system of FIG. 3.

Figure 4A:
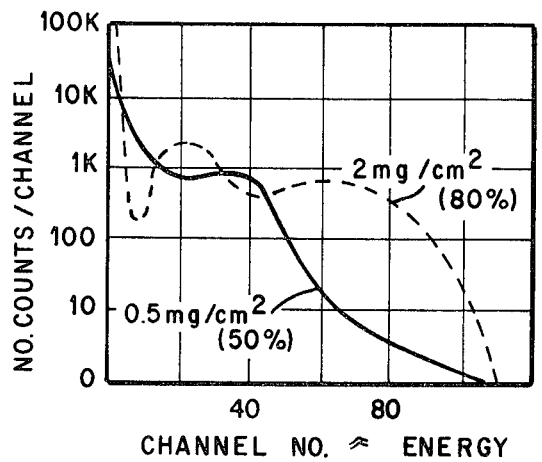
FIG. 4a and FIG. 4b are graphs showing the energy loss spectrum for $Cf^{252}$ fission fragments passing through thin NE 102 scintillator films of various thicknesses when utilized in the device of FIG. 1 and the system of FIG. 3.
Figure 4B:
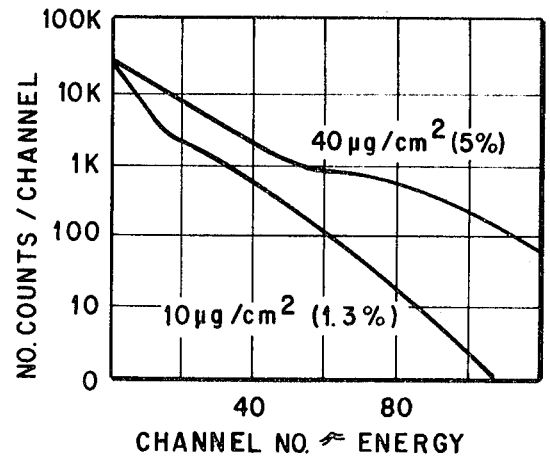
Figure 5A:
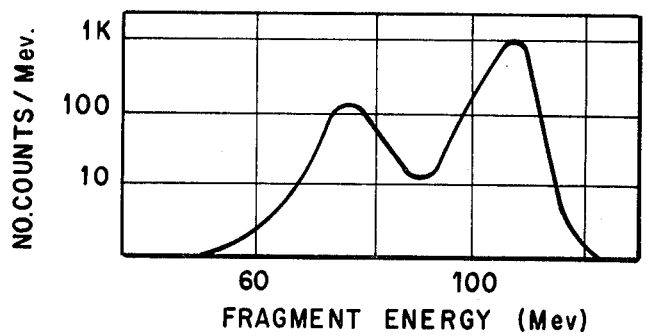
FIG. 5a is a graph of the residual energy spectrum in coincidence with all pulses from the system of FIG. 3.
Figure 5B:
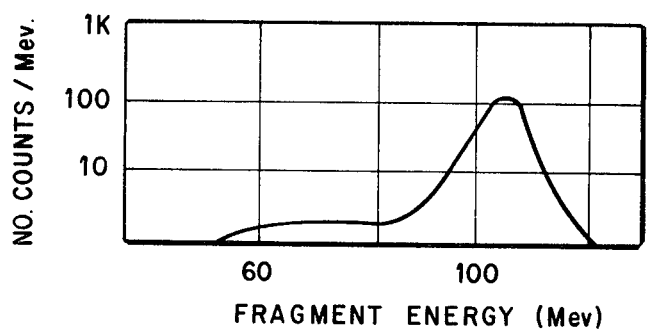
FIG. 5b is a graph of the residual energy spectrum in coincidence with only the larger pulses from the system of FIG. 3.

A spectrum of the amount of fission fragment energy loss in various thicknesses of scintillating film is shown in FIG. 4a and FIG. 4b. The number in parentheses indicates approximate percent absorption of total fragment energy for each of various films of different thicknesses. It can be seen that, as the film is made thinner, a smaller percentage of energy loss is accompanied by a lesser distinction between heavy and light fragment pulse heights. However, the pulses for the thinnest film detector are still distinguishable from background noise as can be seen in FIG. 5a, where the spectrum of the residual fission fragment energy is shown, taken in coincidence (i.e., gated by) all photomultiplier pulses as obtained from the system of FIG. 3. On the other hand, when gated only by the larger pulses (above channel 50) from the photomultiplier, the associated residual energy spectrum indicates that the light fragment (higher kinetic energy) experiences on the average a greater energy loss in the thinnest film scintillator, as can be seen from FIG. 5b.

The great advantage of the detector of the present invention is that, when it is used as a time-of-flight detector, there is provided a clear distinction between time pulses and background noise. This advantage is particularly useful in moderately high radiation fields for which conventional time-of-flight detectors (electron lens and plastic scintillators) exhibit too high a background of spurious pulses.

It should be understood that the present invention is not restricted for use with the specific source of particles mentioned above, but can be equally used for velocity measurements of all types of charged particles with a minimum attenuation of energy. It should also be noted that the present invention cannot only be used as a fission fragment time-of-flight mass spectrometer and as a device for determining the rate of fission fragment energy loss in matter, but also may be used for mass identification in high energy spallation reactions and possibly for determining the heavy mass component of cosmic rays.

This invention has been described by way of illustration rather than limitation and it should be apparent that it is equally applicable in fields other than those described.

We claim:

1. In a time-of-flight particle detector system including a first particle detector, a second particle detector spaced a known distance from said first detector, and means for measuring the time-of-flight of particles between said detectors, the improvement characterized in that said first particle detector is so constructed as to provide time pulses which are clearly distinguishable from background noise even in the presence of high radiation fields, said first detector comprising an enclosure, two Lucite light pipes mounted within said enclosure, an ultrathin plastic scintillator film sandwiched between said light pipes, said film having a thickness of a selected value in the range from 10 $\mu$g/cm.$^2$ to 2 mg./cm.$^2$, a third Lucite light pipe enclosing one end of said enclosure, a photomultiplier tube coupled to said third light pipe, said thin scintillator film being positioned perpendicular to the face of said photomultiplier tube, said enclosure comprising a highly polished metal reflector, said reflector and two Lucite light pipes being provided respectively with diametrically opposed and aligned openings and aligned holes having a common axis perpendicular to said thin film and for passage of particles from an external source of radiation through said thin scintillator film with a minimum of energy loss, and said first detector being adapted to be mounted within an evacuated chamber, whereby said particles passing through said scintillator film trigger light flashes for detection by said photomultiplier tube which in turn provides timing pulses for said detector system.

2. The system set forth in claim 1, wherein said source of radiation is Cf$^{252}$.

3. The system set forth in claim 1, said selected thickness of said scintillator film is 10 $\mu$g/cm$^2$.